United States Patent [19]

Sweetana, Jr. et al.

[11] 4,223,366

[45] Sep. 16, 1980

[54] GAPLESS SURGE ARRESTER

[75] Inventors: Andrew S. Sweetana, Jr., Bloomington, Ind.; Tapan K. Gupta, Monroeville; Richard E. Kothmann, Pittsburgh, both of Pa.; Joseph C. Osterhout, Bloomington, Ind.

[73] Assignee: Electric Power Research Institute, Inc., Palo Alto, Calif.

[21] Appl. No.: 961,011

[22] Filed: Nov. 15, 1978

[51] Int. Cl.[2] .......................... H02H 3/22; H02H 9/04

[52] U.S. Cl. ........................................ 361/127; 315/36

[58] Field of Search ............... 361/127, 126, 117, 128, 361/130; 338/52, 57, 51, 21, 20, 159; 315/36; 313/269, 231.1, 325; 174/35 TS

[56] References Cited

U.S. PATENT DOCUMENTS

| | | | |
|---|---|---|---|
| 3,764,854 | 10/1973 | Craddock | 361/127 |
| 4,092,694 | 5/1978 | Stetson | 361/127 |
| 4,100,588 | 7/1978 | Kresge | 361/127 |

*Primary Examiner*—Patrick R. Salce
*Attorney, Agent, or Firm*—Flehr, Hohbach, Test

[57] ABSTRACT

A gapless surge arrester is disclosed herein and includes a porcelain outer casing and a stack of zinc oxide discs located within the casing for passing surge currents therethrough. Silicon dioxide, preferably sand, is provided between this stack in the casing for transferring heat from the discs to the porcelain outer casing as a result of the surge current and for absorbing fault energy where necessary by changing states.

9 Claims, 4 Drawing Figures

GAPLESS SURGE ARRESTER

BACKGROUND OF THE DISCLOSURE

The present invention relates generally to surge arresters and more particularly to a surge arrester of the gapless type.

Recent research in surge arresters has demonstrated that zinc oxide has the capability of providing a low cost "gapless" arrester as a result of its relatively low power dissipation under steady-state conditions coupled with its ability to clamp voltage at large currents. However, experiments have shown that for a given zinc oxide process the selection of its steady-state voltage rating involves a compromise between thermal runaway and the desire to have an operating voltage close to cross-over. Moreover, it has been noted that a relatively small amount of power, on the order of about 15 watts, is sufficient to cause thermal runaway for certain zinc oxide arresters.

From the foregoing, it should be apparent that gapless surge arresters must be designed with heat dissipation in mind, particularly when the surge arrester is used outdoors and requires a protective casing. A typical gapless surge arrester of this type includes a porcelain outer casing and a stack of zinc oxide discs within the casing for passing surge currents therethrough. In this typical surge arrester, a layer of air (or nitrogen) is maintained between the zinc oxide discs and porcelain casing and hence must act in conjunction with the casing to dissipate the heat generated in the discs as a result of surge currents therethrough. While this is a practical and economical way to dissipate heat it is not highly effective and hence requires a relatively large safety margin between the operating voltage of the arrester and its cross-over to prevent thermal runaway.

There are ways to transfer the heat generated in the zinc oxide discs to the outer procelain casing other than by air or nitrogen. For example, oil or freon could be used and would be more effective than providing an air gap. However, both the oil and freon cause internal pressure problems and, in addition, the freon is relatively expensive. On the other hand, as will be seen hereinafter, the present invention is directed to the utilization of a material which is both practical and economical and yet one which is more effective than air and even oils. Moreover, the particular material selected has additional benefits as will also be seen hereinafter.

Objects and Summary of the Invention

One object of the present invention is to provide a gapless surge arrester designed to effectively and efficiently dissipate heat during current surges to permit operation of the arrester closer to its cross-over point without the fear of thermal runaway.

Another object of the present invention is to provide effective and efficient heat dissipation from both practical and economical standpoints.

Still another object of the present invention is to provide a gapless surge arrester which is designed to minimize damage to its outer casing as a result of excessive internal fault energy.

Yet another object of the present invention is to provide a method of dissipating heat from inside the arrester without interfering with the necessary physical movement of its inner components.

A gapless surge arrester of the type to which the present invention is directed typically includes an open ended electrically non-conductive but thermally conductive outer casing, typically one constructed of porcelain, having an inner wall defining an opening therethrough. This surge arrester also includes means extending through the opening and spaced from the inner wall, typically a stack of zinc oxide or other such metal oxide discs, for passing surge currents. However, rather than maintaining an air gap between this stack of discs and the outer casing and rather than providing oil or freon therebetween, the present invention utilizes an electrically non-conductive particulate material, particularly silicon dioxide (preferably sand). As will be seen hereinafter, this particular material has been found to be more effective and efficient in transferring heat across the gap then air and even oil and is substantially similar to freon. Moreover, it has been found to absorb fault energy by changing to glass and cinders, thereby reducing the serverity and intensity of operation of the surge arrester and reducing the possibility of damage to its casing. In addition, the particulate material allows the discs to expand and contract and otherwise move to a limited degree within the casing.

DETAILED DESCRIPTION AND PREFERRED EMBODIMENTS

Figure 1:
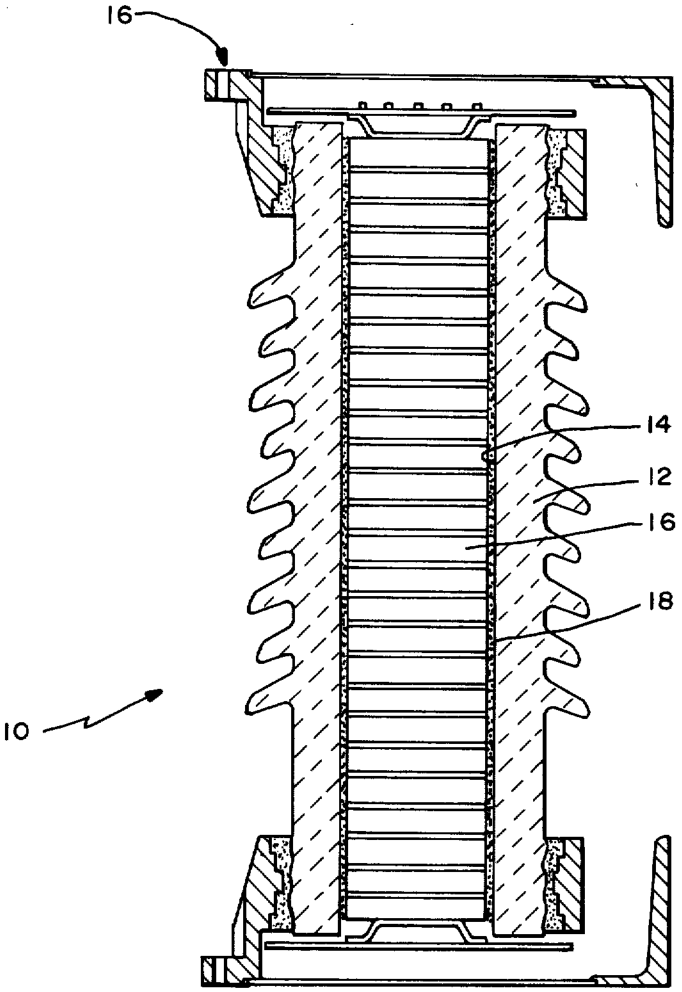
FIG. 1 is a vertical sectional view of a gapless surge arrester constructed in accordance with the present invention.

Turning to the drawings, attention is specifically directed to FIG. 1 which illustrates a gapless surge arrester 10 constructed in accordance with the present invention. In many respects, this arrester is conventional and hence will only be discussed in detail with respect those components which relate to the present invention. As shown in FIG. 1, the arrester includes an open-ended casing 12 which is electrically non-conductive but thermally conductive and which has an inner wall 14 defining a longitudinally extending, usually cylindrical passage therethrough. This casing is typically porcelain. The surge arrester also includes conventional means for passing surge current through the passage, specifically a stack of zinc oxide discs 16. Each disc is spaced inwardly along its entire periphery from inner wall 14 so as to provide a circumferential gap between stack 16 and the casing along the entire length of the passageway defined by the latter.

In accordance with the present invention, the entire gap just described is filled with electrically nonconductive silicon dioxide 18 and preferably consisting of compacted sand having a density between 1.4 and 2.2 grams/cm$^3$. As stated previously, there are a number of advantages in utilizing silicon dioxide and particularly sand over an air (or nitrogen) gap or even the utilization of oil or freon for heat transferring purposes. First, the sand is a more efficient thermal conductor than air at the surge temperatures of the arrester, for example between −40° C. and +200° C., as will be shown with respect to FIGS. 3 and 4 and has also been found to be more effective than some oils. Moreover, it is significantly less expensive than freon and has been found to work just as effectively while it does not create the internal pressure problems of either oil or freon. In addition, the sand is capable of absorbing fault energy by changing to glass and cinders (as a result of the high temperatures), thereby reducing the severity or intensity of failure of the surge arrester and reducing the possibility of shattering or otherwise damaging the porcelain casing. Moreover, as stated previously, this particulate material does not prevent the zinc oxide discs from expanding, contracting or otherwise moving during normal operation.

The sand just described is the preferred medium for transferring heat from the stack of discs 16 to the porcelain casing 12 because of its effectiveness, low cost and relatively problem free nature. However, as stated above, it is to be understood that other electrically non-conductive particulate material could be utilized in accordance with the present invention so long as its thermal conductivity is greater than that of air for the dissipation of heat in the surge temperature ranges and otherwise is compatible with the present invention. Such particulate material could include silicon dioxide generally, sand and other forms of silicon dioxide as well as other materials and combinations thereof.

Figure 2:
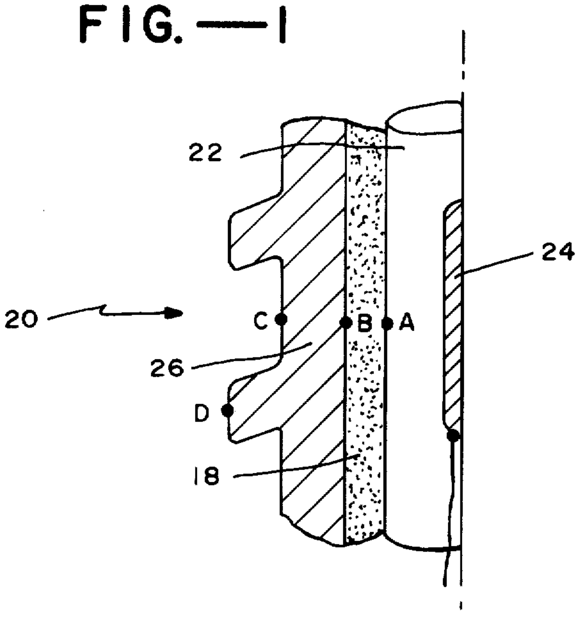
FIG. 2 is a vertical sectional view of an assembly used to similate the surge arrester illustrated in FIG. 1 for demonstrating the way in which the latter dissipates heat.
Figure 3:
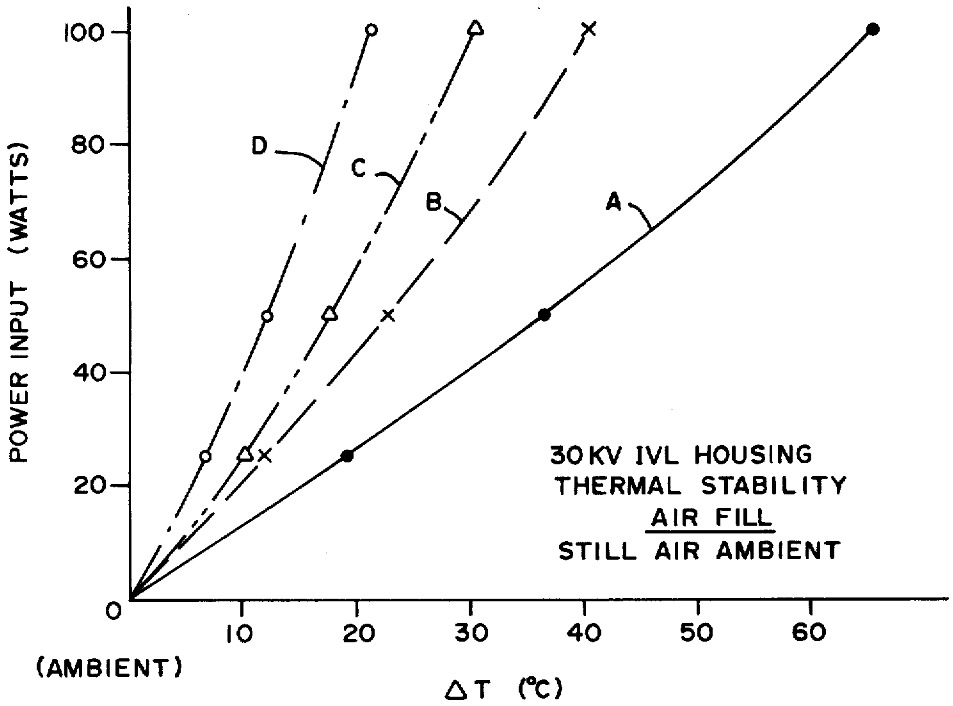
FIG. 3 is a graphic illustration of how temperature changes with power input at various points across a surge arrester constructed in accordance with the prior art.
Figure 4:
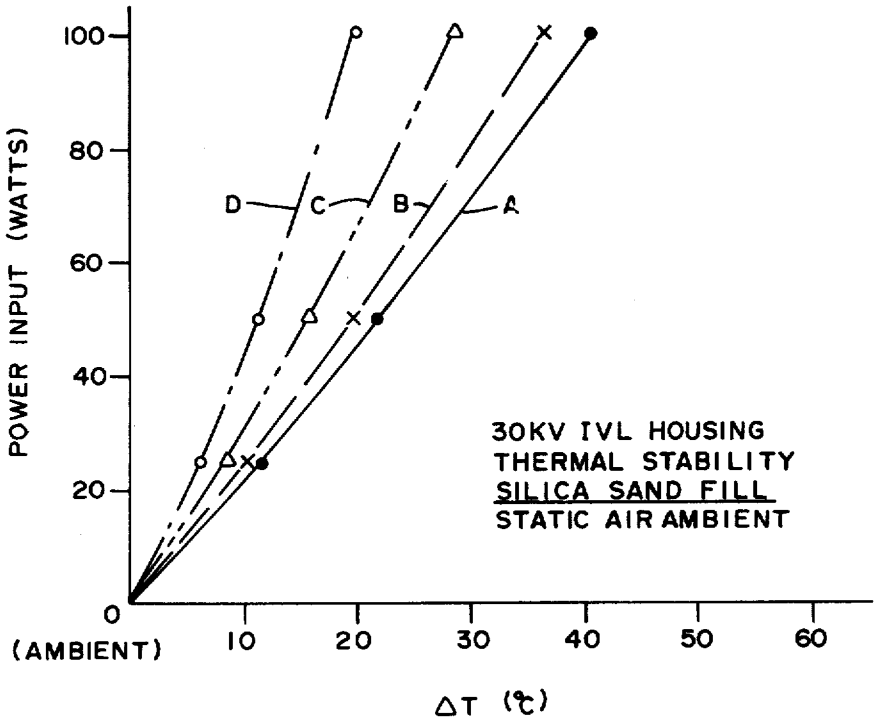
FIG. 4 is a graphic illustration of how temperature changes with power input at various points across the surge arrester constructed in accordance with the present invention.

Having described gapless surge arrester 10, attention is now directed to FIGS. 2, 3 and 4. As stated previously, FIGS. 3 and 4 are graphic illustrations of the way in which temperature changes with power input for a gapless surge arrester constructed in accordance with the prior art and one constructed in accordance with the present invention. More specifically, FIG. 3 shows experimental results of the temperature rise (in degrees "C"), as compared to power input (in watts) generated at various points in a device designed to similate a conventional gapless surge arrester. This simulated device is identical to the arrester illustrated in FIG. 1 except that air is provided in the gap between the zinc oxide discs and casing instead of sand. FIG. 4 shows the same type of results except that the fill media within the gap is thermal conducting silicon dioxide, specifically sand having a density of approximately 1.7 grams/cm$^3$.

Turning specifically to FIG. 2, the simulating device is diagrammatically illustrated and generally designated by the reference numeral 20. This device is identical to surge arrester 10 with certain exceptions. First, device 20 does not include the previously described stack of zinc oxide discs but rather utilizes a solid aluminum cylinder 22 to simulate the latter while an electric heater 24 duplicates the watts loss (heat) of the discs during steady and surge current conditions. Moreover, where the overall device is used to simulate a conventional gapless surge arrester, an air space is provided between the aluminum cylinder and a 30KV IVL porcelain casing 26 which corresponds to the previously described casing 12. When device 20 is used to simulate surge arrester 10 illustrated in FIG. 1, sand 18 is provided in the gap between the aluminum cylinder and the outer casing. In the actual experiments two separate simulating devices are of course used, one with an air gap and one with a sand gap but are otherwise identical to one another and to the surge arrester illustrated in FIG. 1.

In order to monitor the temperature of each of the simulating devices just described four thermocouples are used, specifically thermocouples A, B, C and D. As illustrated in FIG. 2, thermocouple A is located at the boundary between the gap and aluminum cylinder. Thermocouple B is located directly across the gap from the thermocouple A, specifically at the boundary between the gap and outer casing. Thermocouple C is located directly across the outer casing from thermocouple B, specifically between two projecting ribs comprising part of the outer casing and thermocouple D is located at an outermost point on an adjacent projecting rib.

With respect to the graphs illustrated in FIGS. 3 and 4, of particular interest are the temperature differentials across the gap, specifically between points A and B. For example, as illustrated in FIG. 3, at 100 watts, this temperature difference is 25.2° C. (65.5° C.-40.3° C.) when the gap is merely filled with air. Where the gap is filled with sand, the temperature difference between points A and B is only 3.8° C. (40° C.36.2° C.), indicating the effectiveness of the sand as a heat conductor. The significant point in this experiment is that for a comparable watts loss, the stack of zinc oxide discs will run at a substantially lower temperaturerise, specifically 40° C. as compared to 65.5° C. (point A), thereby minimizing the possibility of thermal runaway.

Similar experiments have been conducted using transformer oil (WEMCO-C oil) and freon as the heat transfer medium. The sand was found to be more effective than the transformer oil by approximately 6° C., that is, it provided a temperature at point A 6° less than that of the transformer oil and maintained the temperature at point A only 2.8° higher than the more expensive freon.

What is claimed is:

1. A gapless surge arrester, comprising:

(a) an open-ended, electrically non-conductive but thermally conductive elongated outer casing having a inner wall defining an opening therethrough;

(b) elongated means extending through said opening for passing surge currents, said surge current passing means being spaced along its entire length from the inner wall of said casing so as to provide a circumferential gap between said means and said inner wall along the entire length of said opening; and (c) means consisting essentially of electrically non-conductive particulate material filling the entire circumferential gap between said inner wall and surge current passing means, said particulate material having a thermal conductivity greater than that of air at temperatures of about −40° C. to +200° C.

2. A surge arrester according to claim 1 wherein said particulate material includes silicon dioxide.

3. A surge arrestor according to claim 2 wherein said particulate material consists of sand silicon dioxide and wherein said silicon dioxide is sand.

4. A surge arrester according to claim 1 wherein said casing is constructed of porcelain.

5. A surge arrester according to claim 1 wherein said surge current passing means include a stack of metal oxide discs located within said casing opening.

6. A surge arrester according to claim 5 wherein said opening is cylindrical and said stack of discs is concentrically located within said opening.

7. A gapless surge arrester, comprising:

(a) an open-ended electrically non-conductive but thermally conductive elongated outer casing having an inner wall defining a cylindrical passage therethrough;

(b) means for passing surge currents through said passage, said means including a stack of metal oxide discs extending concentrically through said passage and spaced equidistant from said inner wall whereby to define a circumferential gap between said stack of discs and said inner wall, said gap extending the length of said stack; and (c) means consisting essentially of silicon dioxide within said passage and filling the entire gap between said inner wall and said stack of metal oxide discs.

8. A surge arrester according to claim 7 wherein said casing is constructed of porcelain.

9. A surge arrester according to claim 8 wherein said metal oxide discs are zinc oxide discs.

* * * * *